United States Patent [19]
Crouse et al.
[11] 3,723,710
[45] Mar. 27, 1973

[54] # METHOD AND DEVICE FOR READING AND DECODING A HIGH DENSITY SELF-CLOCKING BAR CODE

[75] Inventors: William G. Crouse; John E. Jones, both of Raleigh, N.C.

[73] Assignee: International Business Machines Corporation, Armonk, N.Y.

[22] Filed: June 28, 1971

[21] Appl. No.: 157,158

[52] U.S. Cl. ........................235/61.11 E, 250/219 D
[51] Int. Cl. ............................G06k 7/10, E04g 17/00
[58] Field of Search..235/61.11 E, 61.11 R, 61.11 D; 340/146.3 K, 173 LT, 174.1 H; 178/17 D; 250/219 D, 219 DC, 219 DD

[56] References Cited

UNITED STATES PATENTS

| | | | |
|---|---|---|---|
| 3,543,007 | 11/1970 | Brinker et al. | 235/61.11 E |
| 3,600,557 | 8/1971 | Zappia | 235/61.11 E |
| 3,617,707 | 11/1971 | Shields et al. | 235/61.11 E |

*Primary Examiner*—Daryl W. Cook
*Attorney*—John B. Frisone

[57] ABSTRACT

A high density self-clocking multiple bar code is scanned to determine the displacement of adjacent leading edges of the bars and of the adjacent trailing edges of the bars. The detected leading and trailing edge displacements are compared with a standard identifiable displacement included in all of the valid codes and are categorized with respect thereto and the sequential categories thus derived define the encoded data.

19 Claims, 10 Drawing Figures

INVENTORS
WILLIAM G. CROUSE
JOHN E. JONES
BY John B. Frisone
ATTORNEY

METHOD AND DEVICE FOR READING AND DECODING A HIGH DENSITY SELF-CLOCKING BAR CODE

BACKGROUND OF THE INVENTION

1. Field of the Invention

The invention relates to data encoding and more particularly to a method and device for reading a high density self-clocking bar code.

2. Description of the Prior Art

The advent of the modern low cost data processor makes possible, for the first time, implementation of automated business establishments such as retail outlets, supermarkets, ticketing offices, banks, etc. Each of the above has its own unique requirements which for the most part can be accommodated in the specific application program utilized in the computer which controls the system.

Each of the applications would, however, rely heavily on coded data. For example, in a retail application, the customers would each be provided with a coded identification card which would include, at the least, the customer's name and account number. Each item for sale would include a coded indicia which would identify the item in detail including information such as size, color, lot number, etc. Some of this information would be used for billing purposes while other information would be used for inventory control, planning or a variety of other purposes too numerous to mention.

When a transaction takes place, coded information is read and supplied to the central computer to enable a completion of the transaction and an adjustment or updating of all affected accounts. It is incumbent in such a system to keep the effort expended in the entry of data to a minimum. Thus, it is essential that previously prepared coded tags, documents or the like which may be manually or automatically scanned be utilized to the greatest extent so as to reduce to a minimum manual intervention by the salesclerk or operator.

In order to achieve this objective, it is necessary that large quantities of data be entered into the system from coded cards, tags and documents. Furthermore, these items must not represent a substantial element in the cost of doing business. They must be easily prepared on conventional readily available equipment such as impact printers and the like on inexpensive record media such as cards and tags or the like. In addition, the equipment for reading the data must be inexpensive, easily operated and durable. Preferably, hand-propelled wands will be used for reading since they place little constraint on the tag, card or document form and are reliable, inexpensive and easily used.

Hand-propelled wands used for code scanning will in normal usage be subjected to accelerations and deceleration which dictate the use of a self-clocking code. A self-clocking retrospective bar code disclosed in U. S. Pat. application, Ser. No. 31,959, filed by E. G. Nassimbene on Apr. 27, 1970 and assigned to the same assignee as this application meets the basic code requirements for use with hand-propelled scanners and with the detecting and processing techniques disclosed is capable of providing, for a numeric set, densities suitable for many applications using the printing equipment set forth above. However, a significant improvement in the densities achievable is considered desirable since it extends the uses to which a system may be put. The conventional credit card after suitable human readable indicia has been added has a restricted area remaining for coded data. In many applications with existing densities, the available area is inadequate for imprinting or recording all the required or desired data.

Basically, there are two factors which influence density and these are scanning and printing tolerances. Scanning tolerances can be improved by utilizing sophisticated mechanically driven scanners which are not subject to accelerations or in which accelerations are highly minimized in the reading area. This solution is not considered satisfactory for several reasons. With this technique, constraints are placed on the media as to size, shape and composition. These constraints severely limit the application over those possible with hand-propelled unconstrained wand-like scanners. In addition, mechanical scanner increase the cost of implementation and reduce reliability. Another object to the use of mechanical scanners is their relative immobility and the concomitant necessity of transporting the media to the scanner rather than transporting the scanner to the media.

Printing tolerances have a substantial effect on achievable density. Impact type printers, which are by far the most common, exhibit the greatest dimensional variation. Insofar as the printers are concerned, the density achievable is a function of the horizontal or linear dimensional tolerance of the printer. The width of the smallest bar used in the code must, in general, be selected so that the horizontal dimensional tolerances of the printing mechanism will not when algebraically added to the nominal bar width change the actual bar width printed from one size to another by either increasing the bar size to the next larger size or decreasing a large bar size to the next smaller size. As stated before, special purpose highly accurate printers may be employed. These will provide an increase in density; however, such a solution is considered unacceptable by many since it would impose a substantial cost burden on a system.

SUMMARY OF THE INVENTION

The invention contemplates a novel method and device for reading a high density retrospective self-clocking multiple bar code in which the code is scanned to determine the displacement or separation of adjacent leading edges of the bars comprising the coded data and the displacement or separation of the adjacent trailing edges of the bars. The detected leading and trailing edge displacements or separations are compared with a standard identifiable displacement separation included in all of the valid codes and are categorized with respect thereto whereby the sequential categories thus derived define the encoded data.

One object of the invention is to provide a novel method for reading a high density retrospective self-clocking bar code.

Another object of the invention is to provide a novel device for reading a high density retrospective self-clocking bar code.

The foregoing and other objects, features and advantages of the invention will be apparent from the following more particular description of preferred embodiments of the invention, as illustrated in the accompanying drawings.

DESCRIPTION OF THE PREFERRED EMBODIMENTS

Figure 1:
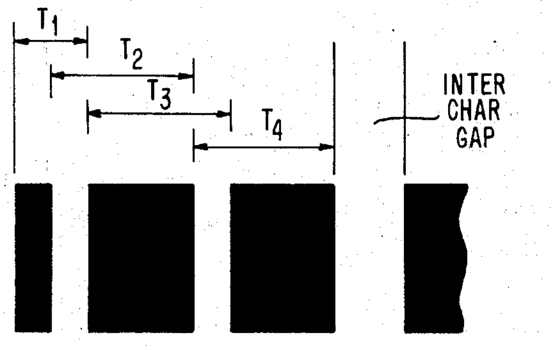
FIG. 1 is a graphic illustration of a self-clocking bar code which may be decoded by the novel method and device disclosed herein.

The self-clocking retrospective bar code illustrated in FIG. 1 is disclosed in U. S. Pat. application, Ser. No. 31,959, referred to above and defines the four-bit binary character (1000) when the coding-decoding rules set forth in the above application are adhered to. The series of marks illustrated may be assigned any significance and all allowable combinations are capable of defining up to 16 unique characters or states since 16 unique combinations are provided with four binary bits. These are set forth in Table I below in which narrow and wide spaces or marks are identified by the letters N and W, respectively, and marks are designated by underscoring the appropriate N̲ or W̲ designation. Spaces are designated by the N and W without underscoring.

TABLE I

| No. | Representation | Binary Code | Character |
|---|---|---|---|
| 1 | N̲ W N̲ W N̲ | 0000 | 0 |
| 2 | W̲ N W̲ N N̲ | 0001 | 1 |
| 3 | N̲ W N̲ N W̲ | 0010 | 2 |
| 4 | N̲ W N̲ N N̲ | 0011 | 3 |
| 5 | W̲ N N̲ W N̲ | 0100 | 4 |
| 6 | N̲ W W̲ N N̲ | 0101 | 5 |
| 7 | W̲ N N̲ N W̲ | 0110 | 6 |
| 8 | W̲ N N̲ N N̲ | 0111 | 7 |
| 9 | N̲ N W̲ N W̲ | 1000 | 8 |
| 10 | N̲ N W̲ N N̲ | 1001 | 9 |
| 11 | N̲ N W̲ W N̲ | 1010 | 10 |
| 12 | W̲ W N̲ N N̲ | 1011 | 11 |
| 13 | N̲ N N̲ W N̲ | 1100 | 12 |
| 14 | N̲ N N̲ W W̲ | 1101 | 13 |
| 15 | N̲ N N̲ N W̲ | 1110 | 14 |
| 16 | N̲ N N̲ N N̲ | 1111 | 15 |

The code representation illustrated in FIG. 1 and those symbolically represented in Table I will in a practical application, be applied to labels, cards, etc. by impact printers such as typewriters or the like. Applicants' have discovered that impact printers cause a smearing of the printed character. This smearing causes the leading and trailing edges of the bars or marks illustrated in FIG. 1 to be displaced in opposite directions from a nominal position. Thus, for example, the leading and trailing edges of the bars under excessive impact forces will separate with respect to each other. This separation, if the representation is produced by a single type element, will cause the interbar spaces to appear smaller than their nominal width; however, the spacing between adjacent leading and adjacent trailing edges remains substantially constant since they are approximately displaced equal distances in the same direction.

For the opposite situation, the interbar spaces appear larger. The leading edges of adjacent bars or marks are displaced approximately equal distances to the right while the trailing edges are displaced approximately equal distances to the left. In both cases, the distances between adjacent leading edges and between adjacent trailing edges varies far less than the variations in the width of the bars or marks and spaces.

In order to take advantage of this fact, the displacement or distance between adjacent leading edges and between adjacent trailing edges are utilized for decoding purposes. These distances are identified in FIG. 1 as $T_1 - T_4$ inclusive. The distance $T_1$ extends from the leading edge of the first bar or mark to the leading edge of the second bar; $T_2$ extends from the trailing edge of the first bar to the trailing edge of the second bar; $T_3$ extends from the leading edge of the second bar to the leading edge of the third bar; and, $T_4$ extends from the trailing edge of the second bar to the trailing edge of the third bar.

The above distances will be either short, medium or long. A short T (S) will result when a narrow bar or space is followed by a narrow space or bar or vice versa. A medium T (M) will result when a narrow bar or space is followed by a wide space or bar or vice versa and a long T (L) will result when a wide bar or space is followed by a wide space or bar or vice versa. When this measurement or decoding technique is used, the information tabulated below in Table II results.

TABLE II

| No. | Representation | $T_1$ $T_2$ $T_3$ $T_4$ | Character |
|---|---|---|---|
| 1 | N̲ W N̲ W N̲ | M M M M | not used |
| 2 | W̲ N W̲ N N̲ | M M M S | 1 |
| 3 | N̲ W N̲ N W̲ | M M S M | 2 |
| 4 | N̲ W N̲ N N̲ | M M S S | 3 |
| 5 | W̲ N N̲ W N̲ | M S M M | 4 |
| 6 | N̲ W W̲ N N̲ | M L M S | 5 |
| 7 | W̲ N N̲ N W̲ | M S S M | 6 |
| 8 | W̲ N N̲ N N̲ | M S S S | 7 |
| 9 | N̲ N W̲ N W̲ | S M M M | 8 |
| 10 | N̲ N W̲ N N̲ | S M M S | 9 |
| 11 | N̲ N W̲ W N̲ | S M L M | 10 |
| 12 | W̲ W N̲ N N̲ | L M S S | 11 |
| 13 | N̲ N N̲ W N̲ | S S M M | 12 |
| 14 | N̲ N N̲ W W̲ | S S M L | 13 |
| 15 | N̲ N N̲ N W̲ | S S S M | 14 |
| 16 | N̲ N N̲ N N̲ | S S S S | 0 |

An examination of Table II shows that each combination of distances $T_1 - T_4$ for the disclosed representations is unique and therefore capable of identifying one of 16 characters. The assignment of the characters is arbitrary but was chosen to most nearly correspond to those illustrated in Table I and to the binary equivalence disclosed in the above said application Ser. No. 31,959. It should also be noted that the first code which results in three medium distances is not utilized. This code is eliminated to facilitate decoding. The remaining codes each include a small distance which is used as a reference for measuring the medium and long distances where they occur. With this technique, the distances $T_1 - T_4$ are measured and stored. The smallest is used as a yardstick and the remaining are measured against it to determine if they are small, medium or large. Obviously, the medium distance could have been used as the reference; however, the circuits necessary for doing it this way would have been more complicated.

Figures 2, 2B:
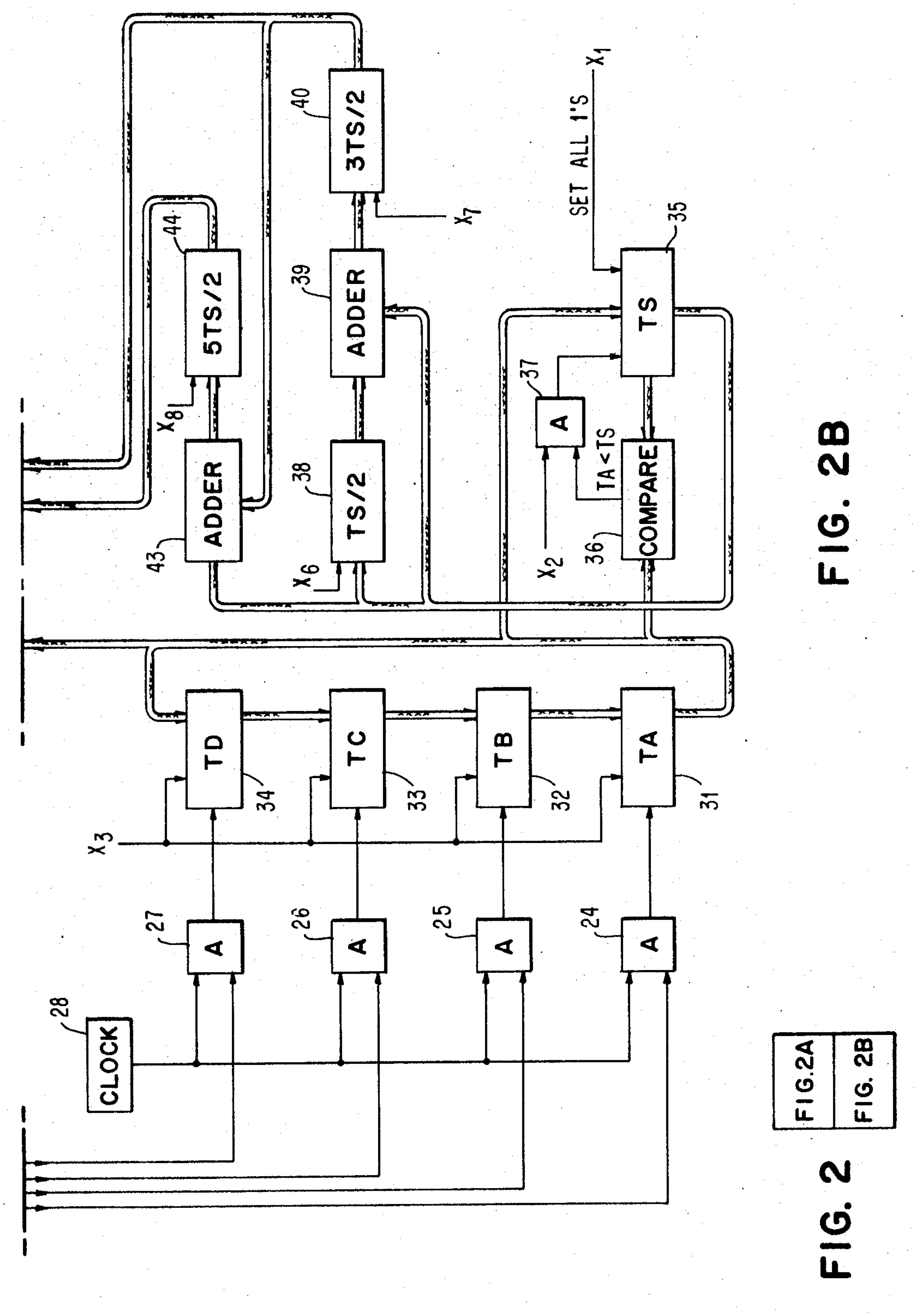
FIG. 2 is a block diagram illustrating the arrangement of FIGS. 2A and 2B which are schematic block diagrams of a novel reading and decoding device constructed according to the invention which is suitable for carrying out the novel reading and decoding method disclosed.
Figure 2A:
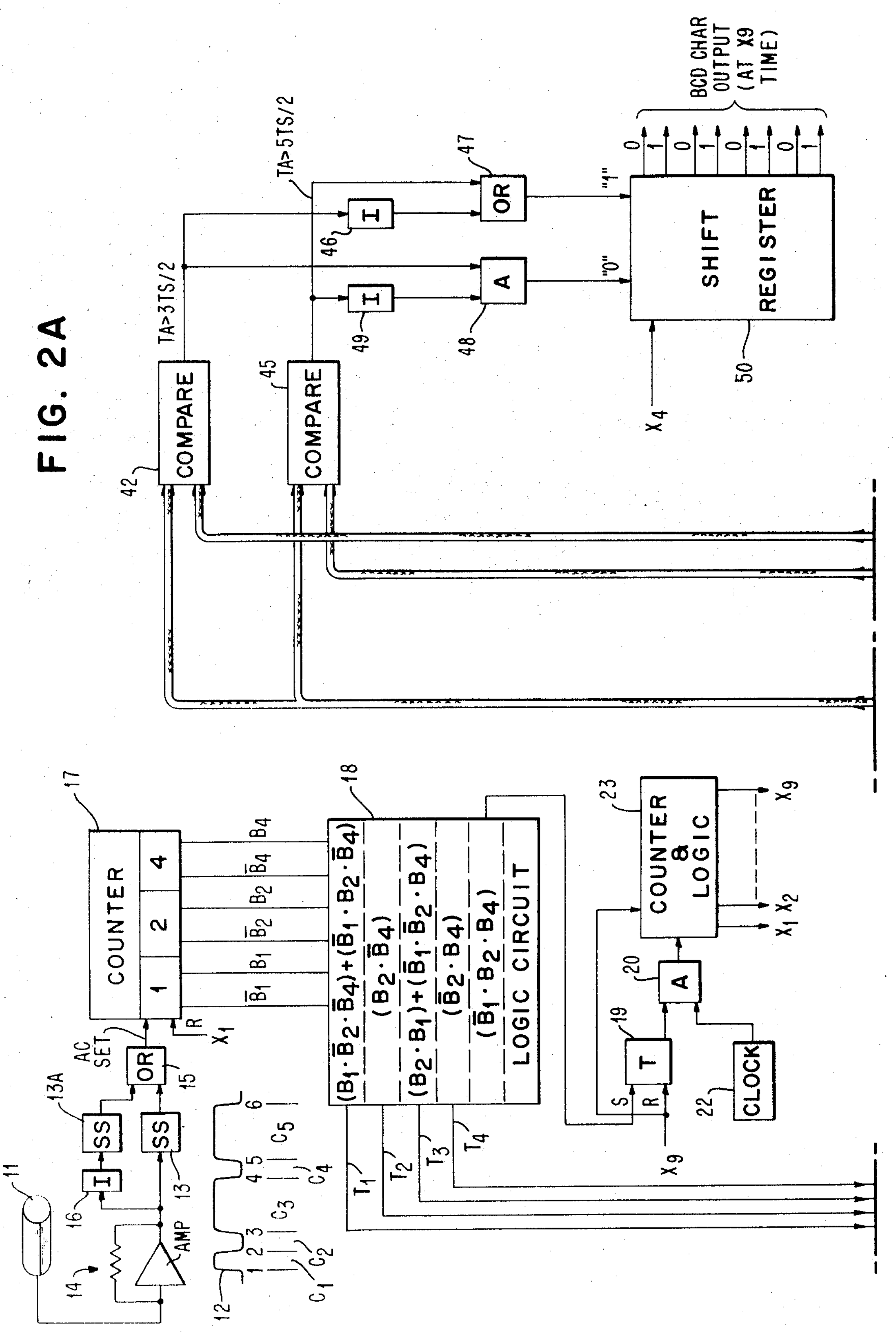

FIGS. 2, 2A and 2B illustrate a circuit for decoding representations according to the method described above. The representations are scanned by a hand-propelled photosensor 11, the output of which, for the representation illustrated in FIG. 1, is indicated on the drawing at 12. The curve 12 illustrates the voltage variation at the output of the hand-propelled photosensor 11 with respect to time for a substantially uniform scan velocity. Obviously, velocity variation, that is, accelerations or decellerations of the hand-propelled scanner will alter the wave form provided at the output of sensor 11. The density of the representations is chosen such that the maximum accelerations possible will not, over the extent of the representation, alter the significance of the data provided at the output of sensor 11.

The output from photosensor 11 is applied via a feedback amplifier 14 to one input of an OR circuit 15 via pulse forming circuit such as single shot circuit 13, in addition the output of feedback amplifier 14 is also applied to the other input of OR circuit 15 via an inverter 16 and another single shot circuit 13A. The output of OR circuit 15 is applied to the AC set input of a binary counter 17. Referring again to the curve shown at 12, counter 17 advances one binary count each time the wave form illustrated at 12 undergoes a transistion. These points are marked 1, 2, 3, 4, 5 and 6 to indicate the six stages that counter 17 assumes as the input from the sensor 11 varies. The states $C_1$, $C_3$ and $C_5$ correspond to the first, second and third bars of the representation respectively while the states $C_2$ and $C_4$ correspond to the first and second interbar spaces, respectively. With the circuits thusfar defined, the distances represented in the graphs are converted from a lineal measure to a time measure. Counter 17 on a time base indicates the various stages of the output of sensor 11.

Figure 3:
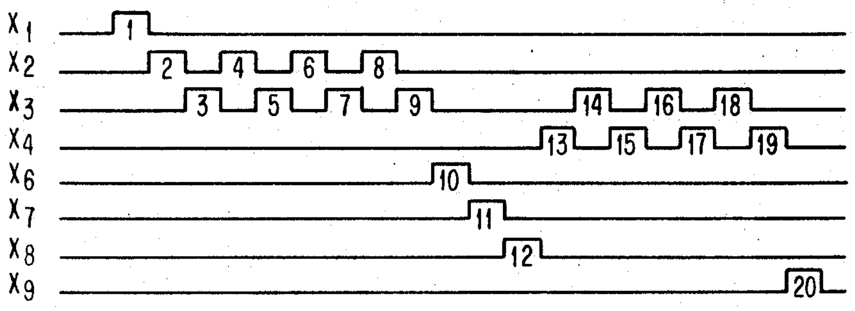
FIG. 3 is a graphic representation of timing signal utilized in the circuit illustrating in FIG. 2.

In the circuit illustrated, counter 17 is provided with three stages. Each of which has two outputs labeled B and $\bar{B}$. The outputs from the various stages bear subscripts corresponding to the weights attributable to those stages. Thus, the first stage provides two outputs $\bar{B}_1$ and $B_1$; the second stage outputs $\bar{B}_2$ and $B_2$; and the third stage outputs $\bar{B}_4$ and $B_4$. The six outputs set forth above are applied to a logical circuit 18 which provides five outputs. Logical functions are indicated in boolean notation for each of the five outputs provided by circuit 18 and at the beginning of counter condition $\bar{B}_1 \cdot B_2 \cdot B_4$, a trigger circuit 19 is set. The condition $\bar{B}_1 \cdot B_2 \cdot B_4$ indicates a completion of the scan of the representation illustrated in FIG. 1. That is, a complete scan of a representation of a given character which occurs at count 6 of counter 17. When trigger 19 is set, an AND gate 20 is enabled. This permits clock pulses from a clock source 22 to be applied to a counter and logic circuit 23. Counter and logic circuit 23 operates on twenty successive clock pulses from source 22 following the setting of trigger 19. The outputs from this circuit $X_1$ – $X_9$ are graphically illustrated in FIG. 3. During clocking pulse 1, the output $X_1$ provides a control signal. The utilization of this control signal as well as the others will be described as the description of the embodiment continues. The output $X_2$ is active during clocking pulses 2, 4, 6 and 8. Output $X_3$ is active during clocking pulses 3, 5, 7, 9, 14, 16 and 18. The output $X_4$ is active during clocking pulses 13, 15, 17 and 19 and the outputs $X_6$ – $X_9$ are active during clocking pulses 10, 11, 12 and 20, respectively. Counter and logic circuit 23 may take many forms. A simple ring counter may be employed in which output stages or positions 1, 10, 11, 12 and 20 are directly provided to provide outputs $X_1$, $X_6$, $X_7$, $X_8$ and $X_9$, respectively. The output $X_2$ may be connected via a conventional OR circuit to the stages 2, 4, 6 and 8 of the ring counter while the output $X_3$ may be connected via an OR circuit to stages 3, 5, 7, 9, 14, 16 and 18 and the output $X_4$ via an OR circuit to stages 13, 15, 17 and 19 of the ring counter. A conventional binary counter may be used with suitable logic circuits for connecting the outputs $X_1$ – $X_9$ to the indicated stages of the binary counter for providing outputs during those periods of time when the counter is advanced to the stated count. The output $X_9$ is applied to the reset input of trigger circuit 19 to reset the trigger and terminate operation of counter and logic circuit 23 since the processing of the data is completed at the end of the twentieth clocking pulse which is provided on the $X_9$ output. The data provided is processed during the 19 preceding clocking pulses and the processing occurs in the intergap space illustrated in FIG. 1. At this time, that is at the completion of processing, counter and logic circuit 23 is restored to a starting condition and is ready to operate on the next representation of a complete character.

The output $T_1$ of logic circuit 18 is available when the counter 17 is at count 1 or count 2 and corresponds to the time periods identified by $C_1$ and $C_2$ in FIG. 2A which in turn corresponds to the scanned distance $T_1$ identified in FIG. 1. The output $T_2$ is available and present during counts 2 and 3 of counter 17 and correspond to time periods $C_2$ and $C_3$ in FIG. 2A which again corresponds to the distance $T_2$ identified in FIG. 1. The output $T_3$ from logic circuit 18 is available during counts 3 and 4 of counter 17 and corresponds to time periods $C_3$ and $C_4$ which again correspond to the distance $T_3$ illustrated in FIG. 1. The output $T_4$ is present during counts 4 and 5 of counter 17 and corresponds to time periods $C_4$ and $C_5$ of FIG. 2A which again correspond to the distance designated $T_4$ in FIG. 1.

Outputs $T_1$ – $T_4$ are applied to one input of AND gates 24 – 27, respectively, and enable their respective AND gates whenever they are available from logic circuit 18 as a result of counter 17 being in the appropriate states described above. A clock pulse source 28 is connected to another input on each of AND gates 24 – 27. The clocking pulses which pass through gates 24 – 27 when they are enabled by the outputs $T_1$ – $T_4$, respectively, are applied to counters 31 – 34. These counters are labeled TA, TB, TC and TD, respectively. With the circuit arrangement thus described, counters 31 – 34 contain counts or values at the time counter 17 reaches a count of 6 which are proportional to the magnitude of the distances $T_1$ – $T_4$, of FIG. 1. That is, counter 31 attains a count under control of the output $T_1$ from logic circuit 18 which corresponds to the distance $T_1$ illustrated in FIG. 1. Counter 32 attains a value which corresponds to the distance $T_2$ illustrated in FIG. 1. Counter 33 attains a value which corresponds to the distance $T_3$ illustrated in FIG. 1 and counter 34 attains a value which corresponds to the distance $T_4$ illustrated in FIG. 1.

At the count of 6, as previously described, trigger 19 is set and the comparison and decoding process for the representation scanned is commenced. This process will take twenty clock periods from clock 22. During the first clock period, counter 17 is reset so as to be prepared for the next scan. This is done by connecting the output $X_1$ from counter and logic circuit 23 to the reset input of counter 17. Also, during the first clock pulse from clock 22, a register 35 is set to all ones under control of the $X_1$ output from counter and logic circuit 23. A parallel output from counter 31 is applied to a compare circuit 36 where it is compared to the contents of register 35. If the contents of counter 31, TA are less than the contents of register 35, TS and AND gate 37 is enabled by the output of compare circuit 36 and under control of the output $X_2$ which occurs during clocking pulses 2, 4, 6 and 8, contents TA of counter 31 are inserted in register 35. Thus, during the second clocking pulse, if the contents TA of counter 31 are less than all ones set into register 35, the all ones condition in register 35 is replaced by the contents TA of counter 31. Under control of output $X_3$, during clocking pulse 3, the contents of the counters 31, 32, 33 and 34 are shifted. That is, the contents TA of counter 31 are inserted in place of the contents TD of counter 34. The contents of counter 34 replaces the contents of counter 33. The prior contents of counter 33 are moved to counter 32 and the prior contents of counter 32 are moved to counter 31. The comparison is repeated during the fourth, sixth and eighth clock pulses of clock 22 and the contents in the counters 31, 32, 33 and 34 are shifted during the fifth, seventh and ninth clock pulses. At the occurrence of the eighth clock pulse, register 35 attains a value which is the least of the values inserted into counters 31, 32, 33 and 34 and upon the ninth clock pulse, the contents of counters 31 – 34 are restored to their initial position.

If a three to one ratio is selected for the wide to narrow distances utilized for the bars and spaces, the midpoints between a short and a medium distance and between a medium and a long distance will be three halves and five halves, respectively of the short distance. During clock pulse 10, 11 and 12 which appear on the output lines $X_6$ – $X_8$ of circuit 23, three halves of the short distance and five halves of the short distance are computed and registered. The contents TS of register 35 are divided by two by applying it to a register 38 and shifting it right one position under control of line $X_6$ during the tenth clocking pulse from clock 22. The contents of register 38 as well as the contents of register 35 are applied to an adder 39 which is inserted into a register 40 under control of the output $X_7$ occurring at clocking pulse 11. Following the insertion under control of line $X_7$, register 40 contains a value which is three halves of the current value of register 35. This value is applied to compare circuit 42. The contents TS of register 35 are also applied to another adder circuit 43. Here it is added to the contents of register 40 and yields during the twelfth clocking pulse from clock 22 the sum which is five halves TS; TS being the contents of register 35. Thus, under control of output $X_8$ from counter and logic circuit 23 which occurs during the twelfth clocking pulse, the output of adder 43 is inserted in a register 44 and stores in register 44 the value five halves TS contained in register 35. The output of register 44 is applied to a compare circuit 45. The other inputs of compare circuit 42 and 45 are connected to counter 31 where a continuous comparison of the value TA inserted in counter 31 is made with the contents of registers 40 and 44 in the comparison circuits 42 and 45, respectively. Comparison circuit 42 will provide a suitable output whenever the contents TA of counter 31 are greater than three halves TS contained in register 40 while compare circuit 45 provides a suitable output when the contents TA of counter 31 are greater than five halves TS contained in register 44.

The output of compare circuit 42 is applied via an inverter 46 to one input of an OR circuit 47 and indicates that TA, the contents of register counter 31, is a short distance. The output of compare circuit 45 is directly connected to the other input of OR circuit 47 and indicates that TA is a long distance. The output of compare circuit 42 in addition is applied to one input of an AND circuit 48 while the other input of AND circuit 48 is connected to the output of compare circuit 45 via an inverter 49. The output of AND circuit 48 indicates that the contents TA of counter 31 represents a medium distance.

The output of AND circuit 48 which represents a medium distance is applied to the zero input of a shift register 58 and the output of OR circuit 47 which represents a short or long distance is applied to the one input of the shift register 50. Data is shifted into register 50 under control of the output $X_4$ from counter and logic circuit 23. During clocking pulse 13, the contents originally inserted in counter 31 are compared with the references generated and previously described and stored in registers 40 and 44. The results of this comparison are inserted in shift register 50 under control of $X_4$ during clocking pulse 13. During clocking pulse 14, the contents of counter 31 – 34 are located as previously described and the comparison which follows during clocking pulse 15 involves the contents initially inserted in counter 32 and under control of clocking pulse 15 via line $X_4$, the results of this comparison are shifted into shift register 50. The process continues during clocking pulses 16, 17, 18 and 19 until the contents of the four registers 31 – 34 have been successively compared in compare circuits 42 and 45 with the previously generated references and the results of the comparison shifted into shift register 50 during the clock pulses 13, 15, 17 and 19 supplied via output $X_4$ of counter and logic circuit 23. Upon the occurrence of clocking pulse 20 on output $X_9$, the contents of shift register 50 may be read and trigger 19 is reset to prepare that circuit for another cycle. As soon as trigger 19 is reset, clocking pulses from source 22 are removed because of the disabling of AND gate 20 to counter and logic circuit 23.

In the above description, a long to short ratio of three to one was selected. While this ratio provides excellent results, other ratios could have been utilized. If other ratios are utilized, the computation of the midpoints will have to be altered to suit the ratios selected.

Figure 4:
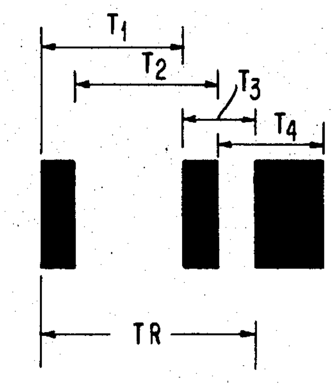
FIG. 4 is a graphic illustration of a variant of the self-clocking bar code illustrated in FIG. 1.

In the embodiment described above, the representations were limited to those containing at least one short distance and this distance was detected and utilized as the reference for categorizing the detected distances. FIG. 4 is a modification in which the representations have been modified so that each of the representations in the set has the same length between the leading edge of the first bar and the leading edge of the third bar. With this technique, scanning accelerations and dimensional tolerances within the character representation may be averaged for the entire character and thus reduce the error components contributed thereby. The distance between the leading edge of the first bar and the leading edge of the third bar is measured and divided to equal the nominal distance of a short bar and this nominal distance is used as the yardstick for measuring the detected distances.

The representation illustrated in FIG. 4 utilizes three different sizes for the bars and spaces rather than the two utilized in the representations of FIG. 1. These are for convenience called narrow (N), intermediate (I) and wide (W). Table III below is similar to Table II; however, it is directed to the modified representations of which the one example is illustrated in FIG. 4.

TABLE III

| No. | Representation | $T_1\ T_2\ T_3\ T_4$ | Character |
|---|---|---|---|
| 1 | N I N I N | M M M M | 0 |
| 2 | N I N I I | M M M L | 1 |
| 3 | N W N N I | L L S M | 2 |
| 4 | N W N N N | L L S S | 3 |
| 5 | N I I N I | M W M M | 4 |
| 6 | N I I N N | M L M S | 5 |
| 7 | W N N N I | L S S M | 6 |
| 8 | W N N N N | L S S S | 7 |
| 9 | N N W N I | S L L M | 8 |
| 10 | N N W N N | S L L S | 9 |
| 11 | N N I I N | S M L M | 10 |
| 12 | N N I I I | S M L L | 11 |
| 13 | N N N W N | S S L L | 12 |
| 14 | I N I N N | M M M S | * *a*/1 |
| 15 | I N N I N | M S M M | * *b*/4 |
| 16 | I N N I I | M S M L | * *c*/5 |
| 17 | I I N N I | L M S M | * *d*/10 |
| 18 | I I N N N | L M S S | * *e*/11 |

The first thriteen representations illustrated in Table III are fully compatible with the representations of Tables I and II and will when decoded by the rules previously described yield the same binary coded four-bit characters. The last five representations are unique when compared with the remainder of the set and may be utilized to designate five additional characters *a*, *b*, *c*, *d* and e as indicated; however, they will, if decoded according to the previously described rules, yield binary coded characters 1, 4, 5, 10 and 11 which are duplicates of characters 1, 4, 5, 10 and 11 above. Thus, the entire set of eighteen characters may be utilized if the novel decoding method disclosed is utilized exclusively. However, if it is desired to decode by the rules set forth in U.S. Pat. application, Ser. No. 31,959, as well as by the method disclosed previously herein, only the thirteen compatible representations may be utilized since only thirteen representations are unique when decoded by both methods.

Even though three widths or size bars and spaces are utilized $T_1 - T_4$ will only fall within three lengths S, M and L as previously described. The narrow/narrow combination yields a small (*s*) T; the narrow/intermediate combination yields a medium (M) T; and the wide/narrow and intermediate/intermediate combinations yield the large (L) T. The wide/wide combination is not utilized since it would yield an additional value for T.

Figure 6:
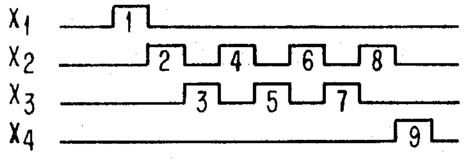
FIG. 6 is a graphic representation of timing signals utilized in the circuit illustrated in FIG. 5.
Figures 5, 5B:
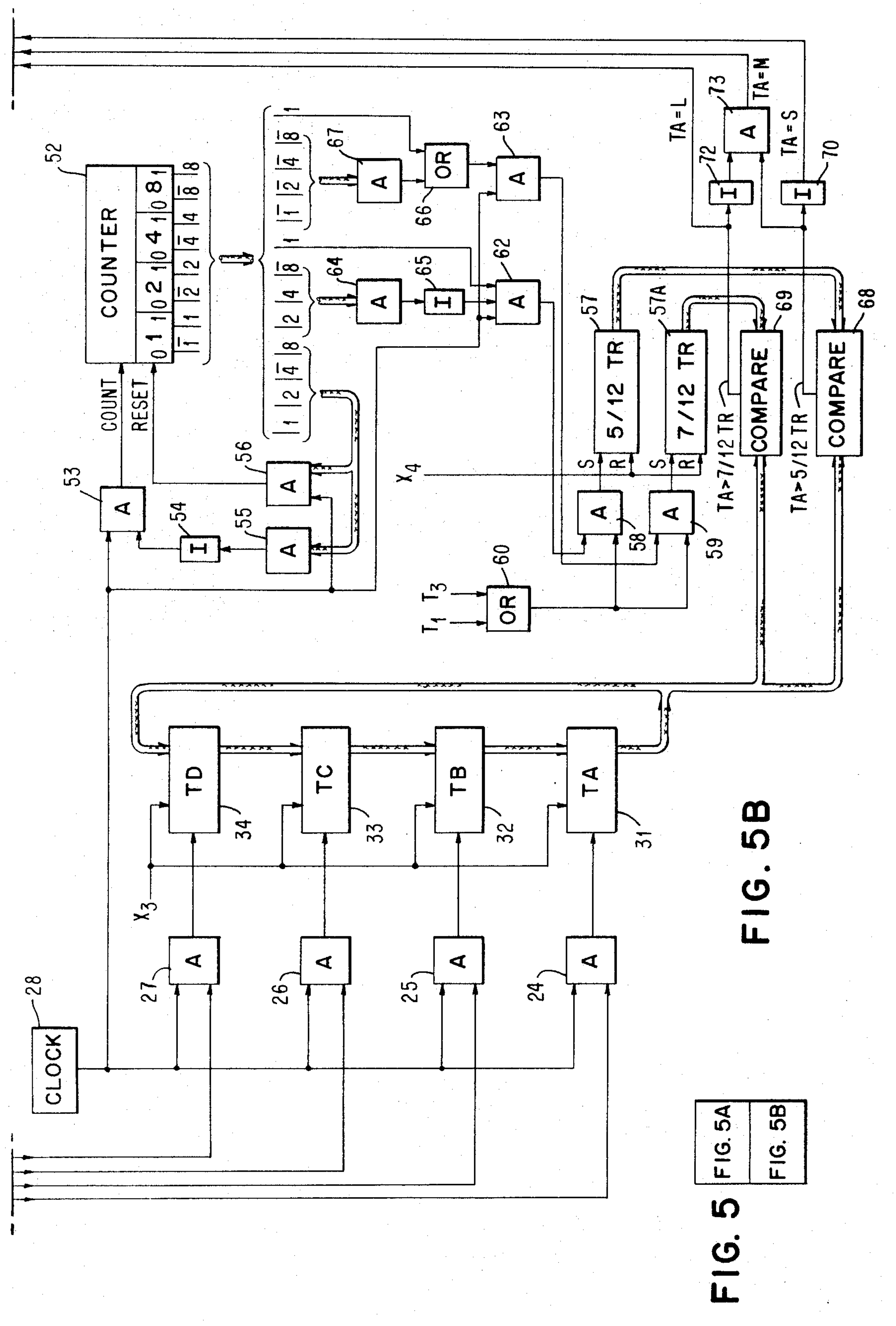
FIG. 5 is a block diagram illustrating the arrangement of FIGS. 5A and 5B which are schematic block diagrams similar to FIG. 2 but adapted to work with the modified code illustrated in FIG. 4.
Figure 5A:
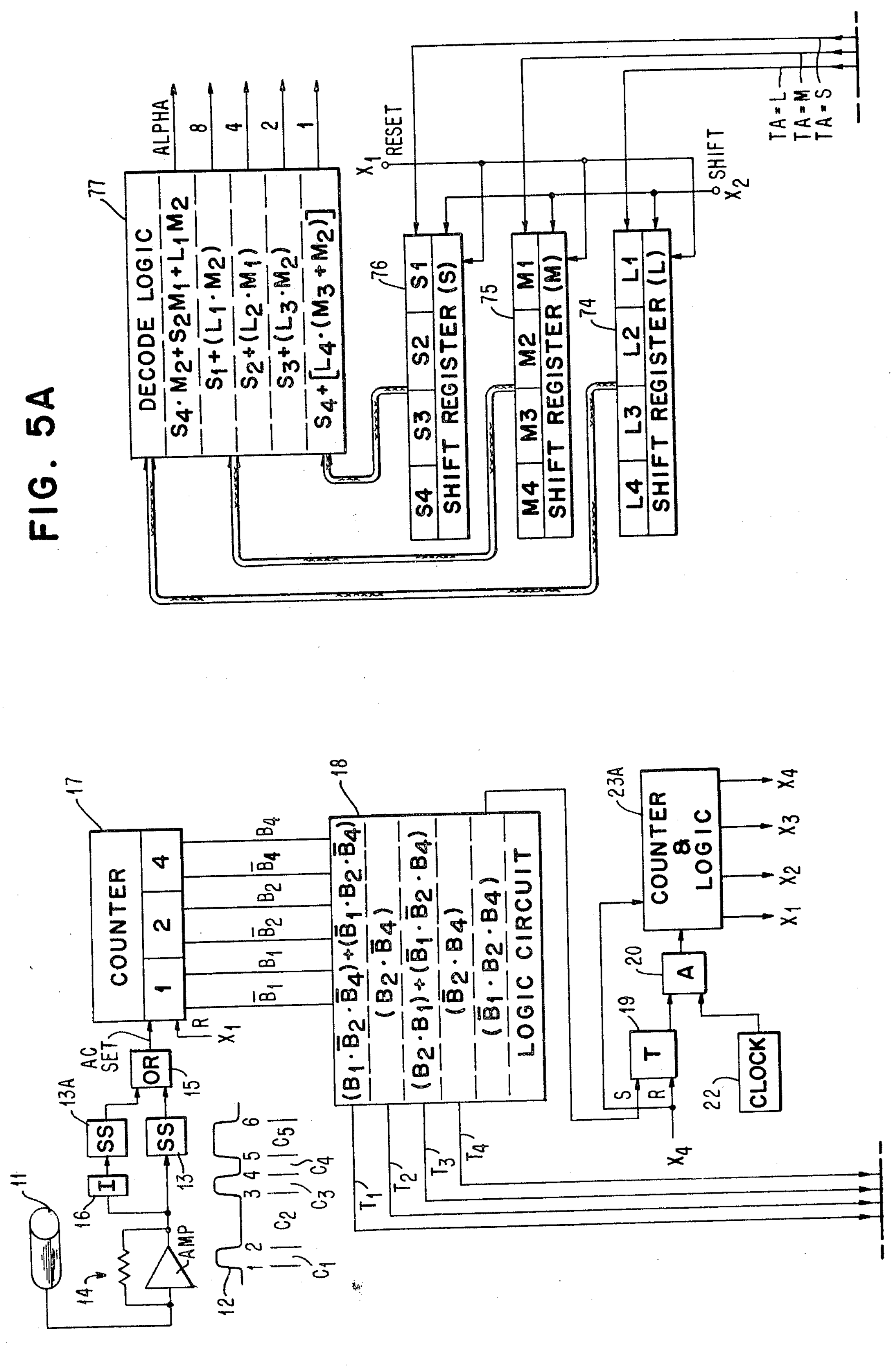

FIGS. 5, 5A and 5B illustrate a circuit suitable for decoding the representations shown in Table III. The circuit is in many respects similar to that illustrated in FIGS. 2, 2A and 2B and described above. Components identical to those described above bear the same reference numeral as used in FIGS. 2A and 2B. The basic similarity exists in what may be called the front end, that is, the components which scan the representations generate signals based on the scan and store the data. The counter and logic circuit 23*a* is similar to counter and logic circuit 23 of FIG. 2A; however, it is provided with only four control outputs $X_1 - X_4$. Output $X_1$ is active during the first clock pulse only. Output $X_2$ is active during clock pulses 2, 4, 6 and 8 and output $X_3$ is active during clock pulses 3, 5 and 7. Output $X_4$ is active during clock pulse 9 and like $X_9$ is used to reset. In this modification, only nine clock pulses are required to process the data and effect decoding once the raw data is stored in registers 31 – 34 as previously described. The timing of outputs $X_1 - X_4$ is illustrated in FIG. 6. The single $X_1$ pulse (clock pulse No. 1) is used to start or initiate decoding and is similar to $X_1$ in the previously described embodiment and resets counter 17 in preparation for decoding the next representation to be scanned. The four pulses on $X_2$ perform essentially the same function as pulses 13, 15, 17 and 19 on output $X_4$ of the previously described embodiment, and the three pulses on $X_3$ perform the same function as pulses 14, 16 and 18 on $X_3$ in the previously described embodiment.

The representations illustrated in FIG. 4 and defined in Table III are selected to have nominal distances T having the ratios 2:3:4 for narrow, intermediate and wide, respectively. The midpoints between the short and medium and between the medium and long distances are 2.5*k* and 3.5*k*, respectively. The ratios of these midpoints to the reference distance described above is arbitrarily set at 2.5/6 and 3.5/6 by selecting a reference distance equal to 6*k* and in turn may be converted to 5/12 and 7/12, respectively, for ease in manipulation. Thus, any distance T being less than 5/12(6*b7*) is a short and any distance, T being greater than 7/12(6*k*) is a long. The quantity *k* above is a constant and is determined by a number of factors which primarily include the actual bar widths and the velocity with which the representations are scanned. However, other factors which include the above may be utilized as long as the ratios set forth above are utilized. This will become apparent below as the circuit is described.

Clocking pulses from clock source 28 are applied to the count input of a counter 52 via an AND gate 53 which is enabled via an inverter circuit 54 and an AND circuit 55 whenever counter 52 is not simultaneously (1·2·4·8). The counter 52 is reset at or under the above conditions via an AND gate 56 and a clock pulse from source 28. This circuit arrangement causes counter 52 to cyclically count from 0-11 which is twelve counts per cycle at the rate of clock source 28.

A pair of counters 57 and 58A labeled 5/12TR and 7/12TR, respectively have their count inputs connected to AND gates 58 and 59, respectively. These gates are enabled by the $T_1$ and $T_3$ outputs from logic circuit 18 via an OR circuit 60. Counter 57 counts five out of every twelve clock pulses from source 28 during the $T_1$ and $T_3$ periods which periods coincide with the reference distance previously described. Counter 57A operates identically except that it counts seven out of every twelve clock pulses from source 28.

The selection of the five and seven clock pulses is under control of AND gates 62 and 63, respectively. Gate 62 has three inputs. One is connected to clock pulse source 28, another is connected to the "one" output of the first stage of counter 52 and is up or active six out of the twelve counts of counter 52. The third input to AND circuit 62 is up or active at all times with the exception of one count coinciding with the second input described above. This is accomplished by ANDing the "one" outputs of the second and fourth stages and the "zero" output of the third stage of counter 52 in an AND circuit 64. The output of AND circuit 64 is inverted in an inverter 65 and applied to the third input of AND gate 62 and inhibits the gate at a count of seven, thus gate 62 is enabled in any five of the six odd counts.

AND gate 63 has two inputs. One is connected to clock pulse source 28 and the other is up or active during seven of the twelve counts per cycle of counter 52. This is accomplished by connecting the other input of AND gate 63 to the "one" output of the first stage of counter 52 via an OR gate 66 to enable the other input during six of the twelve counts of each cycle. The additional count is obtained by enabling the gate 63 at count zero. The "zero" outputs of all four stages of counter 52 are ANDed in an AND circuit 67 and applied via OR circuit 66 to the other input of AND gate 63.

The contents of counter 57, which represent 5/12 of the reference distance, is applied to a comparator circuit 68 and is continuously compared with the contents TA of counter 31. If TA exceeds 5/12TR, the comparator 68 provides an output indicative of that condition or state. The contents of counter 57A which represent 7/12 of the reference distance, is applied to a comparator circuit 69 and is continuously compared with the contents TA of counter 31. If TA exceeds 7/12TR, the comparator 69 provides an output indicative of that condition or state.

When comparator 69 indicates the above described state, TA is considered to define a long distance T and when comparator 68 does not indicate the described state, TA is considered a short distance T. This is accomplished by inserting an inverter circuit 70 in the output of comparator circuit 68. A medium distance for T is signaled by inverting the output of comparator circuit 69 in an inverter 72 and ANDing the inverted output with the output of comparator 68 in an AND circuit 73.

The output from comparator circuit 69 is connected to the input of a shift register 74 which has its shift control connected to the $X_2$ output from counter and logic circuit 23A. If the output from comparator 69 indicates TA is a long (L), a "one" is shifted in when line $X_2$ is up or active; otherwise, a "zero" is shifted into register 74 under control of $X_2$. Shift register 74 is reset with the first clock pulse on $X_1$ and ready to accept data for processing thereafter. Similarly, the output of AND circuit 73 and inverter 70 are connected to shift registers 75 and 76, respectively. These shift registers are identical and operate in the same manner as shift register 74.

The initial contents of counter 31 are compared during the second clock pulse on $X_2$ of a given cycle of circuit 23A. On the third clock pulse, the data in counters 31 – 34 is shifted under control of $X_3$ and the fourth clock pulse on $X_2$ compares and shifts the initial contents of counter 32. The above process is repeated in the fifth and sixth and seventh and eighth clock pulses. Thus, stages 4 of registers 74 – 76 indicate the value of $T_1$ and stages 3, 2 and 1 the values of $T_2$, $T_3$ and $T_4$, respectively.

The stages of registers 74 – 76 are connected to a decode logic circuit 77 which decodes the contents of registers 74 – 76 in binary form. The decoding logic is illustrated in the block in boolean notation. The output of circuit 77 is available and valid on the ninth clock pulse on output line $X_4$. The output on line $X_4$ is also used to reset counter 57 and 57A to prepare them to process the next representation scanned.

The labeled conductors 1, 2, 4 and 8 of circuit 77 will identify all combinations in compatible binary form for all codes illustrated in Table III. The output line labeled "alpha" will identify the last five codes listed and the other outputs will indicate which of these codes is present. If a compatible system only is required, the "alpha" output and the associated logic is not required and the last five codes may be used interchangeably as indicated in the table with codes corresponding to the same character above.

While the invention has been particularly shown and described with reference to preferred embodiments thereof, it will be understood by those skilled in the art that various changes in form and details may be made therein without departing from the spirit and scope of the invention.

What is claimed is:

1. A method for decoding a high density self-clocking multiple bar coded representation which includes a plurality of bars separated by areas of detectably different characteristics and in which the bars and spaces have one or more different widths comprising the steps of:
   - measuring the separation between adjacent leading edges of the bars comprising the coded data;
   - measuring the separation between adjacent trailing edges of the bars comprising the coded data;
   - measuring the extent of a reference distance included in each of the codes in the code set; and
   - categorizing the separations with respect to the measured reference distance whereby the categorizations define the bar coded representations in terms of the bar edge separations.

2. The method set forth in claim 1 in which the said reference distance is measured by examining the measured separations between adjacent leading edges and between adjacent trailing edges and selecting the one which meets a predetermined requirement.

3. The method set forth in claim 2 in which the one selected is the shortest separation measured.

4. The method set forth in claim 1 in which the said reference distance extends from an edge of one of the bars to an edge of another bar and encompasses a substantial extent of the representation and is measured by summing at least two predetermined separations.

5. The method set forth in claim 1 in which the said reference distance extends from the leading edge of the first bar to the leading edge of the last bar and is measured by summing all the separations between adjacent leading edges.

6. A method for decoding a high density self-clocking mutliple bar coded representation which includes a plurality of bars separated by areas of detectably different characteristics and in which the bars and spaces have one or more different widths comprising the steps of:

measuring in sequence the separation between adjacent leading edges of the bars comprising the coded data;

measuring in sequence the separation between adjacent trailing edges of the bars comprising the coded data;

measuring the extent of a reference distance included in each of the codes in the code set; and categorizing the separations, in the sequence measured, with respect to the measured reference distance whereby the sequential categorizations define the bar coded representations in terms of the bar edge separations.

7. The method set forth in claim 6 in which the said reference distance is measured by examining the measured separations between adjacent leading edges and between adjacent trailing edges and selecting the one which meets a predetermined requirement.

8. The method set forth in claim 7 in which the one selected is the shortest separation measured.

9. The method set forth in claim 6 in which the said reference distance extends from an edge of one of the bars to an edge of another bar and encompasses a substantial extent of the representation and is measured by summing at least two predetermined separations.

10. The method set forth in claim 6 in which the said reference distance extends from the leading edge of the first bar to the leading edge of the last bar and is measured by summing all the separations between adjacent leading edges.

11. A device for scanning and decoding a high density self-clocking mutliple bar coded representation which includes a plurality of bars separated by areas of detectably different characteristics and in which the bars and spaces have one or more different widths comprising:

first means for scanning the representation and generating electrical signals which are an analog of the representation;

second means responsive to said first means for generating and storing a plurality of unique signals indicative of the time required to scan the representation between adjacent leading edges of the bars and between adjacent trailing edges of the bars;

third means responsive to said second means for generating a reference signal based on a unique characteristic of the analog signal included in each representation of the allowable set of representations; and fourth means responsive to said second and third means for comparing the stored signals with the generated reference for categorizing the stored signals with respect to said generated signal in a sequence corresponding to the scanning sequence whereby the sequential categorizations define the bar coded representation scanned in terms of the bar edge separations.

12. A device as set forth in claim 11 in which said third means includes, means for examining the signals stored in the second means and selecting one of the stored signals which satisfies a predetermined criteria for use as the reference signal.

13. A device as set forth in claim 12 in which the stored signal indicating the shortest scanning time is selected as the reference.

14. A device as set forth in claim 11 in which said third means includes circuit means responsive to a plurality of preselected generated signals from said second means for generating a reference signal which corresponds to the time duration of said preselected generated signals.

15. A device as set forth in claim 14 in which the preselected generated signals include only those indicative of the time required to scan the representation between adjacent leading edges of the bars.

16. A device for scanning and decoding a high density self-clocking multiple bar coded representation which includes a plurality of bars separated by areas of detectably different characteristics and in which the bars and spaces have one or more different widths comprising:

first means for scanning the representations and generating electrical signals which are an analog of the representation, said signals including alternating first and second electrical characteristics corresponding to the alternating characteristics of the scanned representation;

second means responsive to the alternating electrical characteristics of the generated signal for counting transistions from one signal characteristic to the other and vice versa and providing an output indicative of the instantaneous value of the count;

third means responsive to the output of the said second means for providing a plurality of sequential timed outputs corresponding to the elapsed time between adjacent transitions in the same direction;

counting means responsive to the timed outputs from said third means for accumulating a count corresponding to each of the said timed outputs from said third means;

fourth means responsive to said counting means for examining the data supplied to said fourth means via said timed outputs and determining a reference from the data supplied, which reference corresponds to a common characteristic of all the allowable representations in the set of representations; and, means for comparing the reference with each of the counts, corresponding to the timed outputs, contained in the said third means for categorizing the counts with respect to said reference whereby the representation is categorized in terms of bar edge separations.

17. A device as set forth in claim 16 in which the said fourth means selects the least count for the reference.

18. A device as set forth in claim 16 in which the said fourth means selects a reference which extends over a substantial extent of the representations.

19. A device as set forth in claim 16 in which the said fourth means selects a reference which extends from one edge of the first bar to the corresponding edge of the last bar by accumulating a count equal to the counts controlled by timed outputs corresponding to the said elapsed time between all adjacent transitions in the same one direction only.

* * * * *